United States Patent
Kamiyama et al.

(10) Patent No.: US 7,427,034 B2
(45) Date of Patent: Sep. 23, 2008

(54) INFORMATION PROCESSING APPARATUS AND LOOP ANTENNA

(75) Inventors: Kenichi Kamiyama, Tokyo (JP); Masayoshi Abe, Kanagawa (JP); Satoru Kondo, Kanagawa (JP); Keiichi Shinozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 38 days.

(21) Appl. No.: 11/532,659

(22) Filed: Sep. 18, 2006

(65) Prior Publication Data
US 2007/0063041 A1 Mar. 22, 2007

(30) Foreign Application Priority Data
Sep. 21, 2005 (JP) ............................. 2005-273084

(51) Int. Cl.
*G06K 19/06* (2006.01)
(52) U.S. Cl. .................. 235/492; 235/451; 235/441; 235/439; 343/788; 343/842
(58) Field of Classification Search ............... 235/492, 235/441, 451, 380, 487, 449; 343/788, 842
See application file for complete search history.

(56) References Cited

U.S. PATENT DOCUMENTS

| 5,767,813 | A | * | 6/1998 | Verma et al. | 343/744 |
|---|---|---|---|---|---|
| 6,950,074 | B2 | * | 9/2005 | Arisawa et al. | 343/748 |
| 7,070,101 | B2 | * | 7/2006 | Deguchi et al. | 235/451 |
| 2003/0075608 | A1 | * | 4/2003 | Atherton | 235/492 |
| 2005/0029919 | A1 | * | 2/2005 | Notohara et al. | 313/326 |
| 2007/0139285 | A1 | * | 6/2007 | Maruyama et al. | 343/741 |

FOREIGN PATENT DOCUMENTS

JP 2003-036427 2/2003

* cited by examiner

*Primary Examiner*—Edwyn Labaze
(74) *Attorney, Agent, or Firm*—Sonnenschein Nath & Rosenthal LLP

(57) ABSTRACT

An information processing apparatus for use in a transmitting or receiving operation by a non-contact type IC card function and a reader/writer function includes a loop antenna having a feeding element having a first number of turns winded in a predetermined form, and a non-feeding element provided inside or outside of the feeding element and having a second number of turns winded in the form.

7 Claims, 11 Drawing Sheets

FIG. 1

--PRIOR ART--

FIG. 2

--PRIOR ART--

INFORMATION PROCESSING APPARATUS AND LOOP ANTENNA

CROSS REFERENCES TO RELATED APPLICATIONS

The present invention contains subject matter related to Japanese Patent Application JP2005-273084 filed in the Japanese Patent Office on Sep. 21, 2005, the entire contents of which being incorporated herein by reference.

BACKGROUND OF THE INVENTION

1. Field of the Invention

The present invention relates to an information processing apparatus and a loop antenna and, in particular, an information processing apparatus and loop antenna, which allow the communication, transmission or receipt with the other party by radio.

2. Description of the Related Art

In the recent years, a non-contact IC (Integrated Circuit) card has been widely spread. An IC card can record a larger amount of data than that of the other cards such as a magnetic card and can encrypt data, resulting in a high level of security. For example, an IC card may be applied as a storage card for electronic money, a commuter ticket in a transport facility and a credit card in a financial facility. Contact and non-contact type IC cards are available depending on the communication method. The non-contact type IC card internally contains a loop antenna having an antenna line wired by a predetermined number of turns to be used for communication with a terminal such as a special reader/writer by weak radio.

A non-contact type IC card may be built in mobile equipment such as a cellular phone so as to include not only an IC card function being capable of communicating with a special reader/writer but also a reader/writer function (R/W function) being capable of communicating with other non-contact type IC cards. In the following description, the term, card mode, refers to that a non-contact type IC card operates with the IC card function, and the term, reader/writer mode, refers to that a non-contact IC card operates with the reader/writer function.

Figure 1:
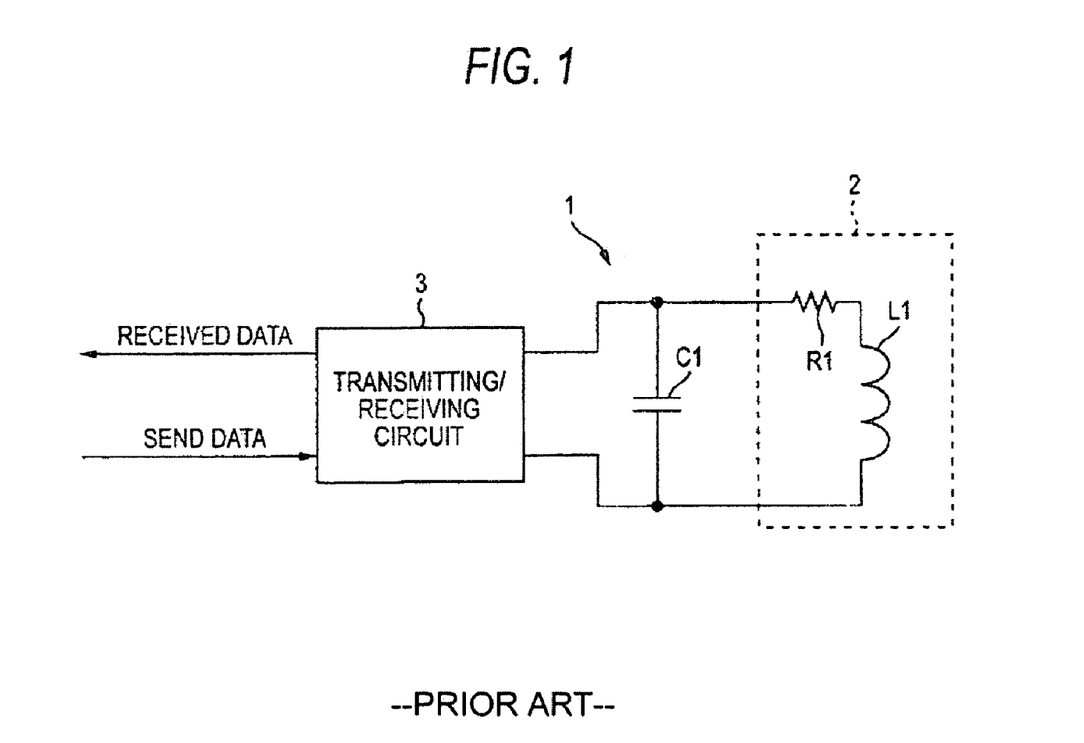
FIG. 1 is a block diagram showing a construction example of a front-end circuit of a non-contact type IC card in the past, which operates in the card mode.

A front end circuit 1 of a non-contact type IC card in the past, which operates in the card mode, includes a capacitor C1, a loop antenna 2 and a transmitting/receiving circuit 3, as shown in FIG. 1. The shown inductance L1 exhibits the inductance component of the loop antenna 2, and the resistance R1 exhibits the resistance component of the loop antenna 2. The loop antenna 2 may be expressed by an equivalent circuit including the inductance L1 and resistance R1, which are connected in series.

In a receiving operation, the loop antenna 2 receives a modulated wave (signal) transmitted from a reader/writer (not shown) and supplies the received modulated wave to the transmitting/receiving circuit 3. The transmitting/receiving circuit 3 then performs predetermined processing on the modulated wave supplied from the loop antenna 2 and supplies the resulting receive data to a CPU (Central Processing Unit) (not shown). In a transmitting operation, the transmitting/receiving circuit 3 performs predetermined processing on the send data supplied from the CPU (not shown) and supplies the resulting modulated wave (signal) to the loop antenna 2. The loop antenna 2 transmits the modulated wave from the transmitting/receiving circuit 3 to the reader/writer (not shown).

In the front end circuit 1 in FIG. 1, the capacitor Cl is connected in parallel across the serially connected resistance R1 and inductance L1, which is defined to resonate at a predetermined frequency. In other words, the front end circuit 1 operating in the card mode includes a parallel resonant circuit resulting from the connection of the capacitor C1 to the loop antenna 2 in parallel, as shown in FIG. 1, such that the front end circuit 1 can communicate with the reader/writer (not shown) efficiently.

Figure 2:
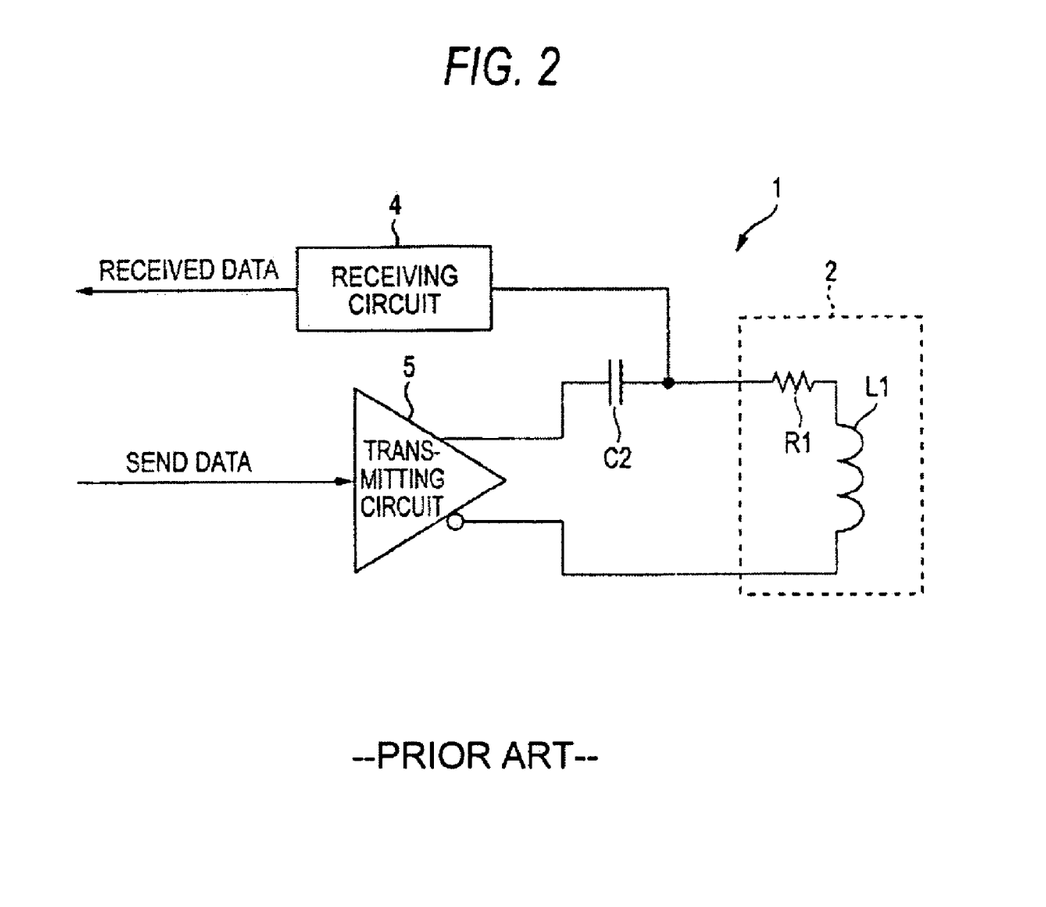
FIG. 2 is a block diagram showing a construction example of a front-end circuit of a non-contact type IC card in the past, which operates in the reader/writer mode.

The front end circuit 1 of a non-contact type IC card in the past, which operates in the reader/writer mode, includes a capacitor C2, the loop antenna 2, a receiving circuit 4 and a transmitting circuit 5, as shown in FIG. 2. The same reference numerals are given to the same components as those in FIG. 1, and the description will be omitted (appropriately) herein.

In a receiving operation, the loop antenna 2 receives a modulated wave (signal) transmitted from an IC card (not shown) and supplies the received modulated wave to the receiving circuit 4. The receiving circuit 4 then performs predetermined processing on the modulated wave supplied from the loop antenna 2 and supplies the resulting received data to a CPU (not shown). In a transmitting operation, the transmitting circuit 5 performs predetermined processing on the send data supplied from the CPU (not shown) and supplies the resulting modulated wave (signal) to the loop antenna 2. The loop antenna 2 then transmits the modulated wave supplied from the transmitting circuit 5 to the IC card (not shown).

In the front end circuit 1 in FIG. 2, the capacitor C1, resistance R1 and inductance L1 are serially connected, resulting in a resonant circuit. In other words, the front end circuit 1 operating in the reader/writer mode includes a serial resonant circuit in which the capacitor C2 and loop antenna 2 are connected in series, as shown in FIG. 2, which allows efficient communication with another non-contact type IC card (not shown).

As described above, the front end circuit 1 in the past has different circuit constructions one of which is optimum for the operation in the card mode and the other of which is optimum for the operation in the reader/writer mode. In general, the loop antenna 2 in the card mode has a better communication characteristic (receiving characteristic) with more turns while the loop antenna 2 in the reader/writer mode has a better communication characteristic (transmitting characteristic) with fewer turns.

Notably, the better communication characteristic of the loop antenna 2 in the reader/writer mode with fewer turns is limited to the case with the transmitting circuit 5 being capable of energizing by constant voltage driving.

Furthermore, there is provided (as disclosed in JP-A-2003-36427 (Patent Document 1)) a semiconductor integrated circuit apparatus, which operates in either card mode or reader/writer mode for external equipment, driving an antenna that communicates with the equipment by using a differential output based on a send data signal and send carrier signal to be transmitted to the equipment, and detecting data transmitted from the equipment based on the signal supplied from the antenna and rectified in a parasitic diode bridge circuit.

SUMMARY OF THE INVENTION

However, a non-contact type IC card including both of the IC card function and the reader/writer function has different number of turns in the loop antenna for better communication sensitivity due to the difference in function.

For example, a non-contact type IC card in the card mode has better communication sensitivity with a loop antenna having more turns while a non-contact type IC in the reader/writer mode has better communication sensitivity with a loop antenna having fewer turns. Since the characteristics of the modes are opposite, the implementation of the functions of both of the modes with one loop antenna may result in the compromise of the characteristic of one mode or unsatisfactory characteristics of both of the modes.

For example, the semiconductor integrated circuit apparatus disclosed in JP-A-2003-36427 obtains more preferable receiving sensitivity by using a signal rectified in a parasitic diode bridge circuit but does not consider the number of turns of the loop antenna for differences in mode and may not produce better communication sensitivity.

Alternatively, when separate loop antennas are provided for both modes, the loop antennas interfere with each other. However, designing in consideration of the interference may be difficult.

According to an embodiment of the invention, the communication sensitivity can be more improved.

According to an embodiment (first embodiment) of the present invention, there is provided an information processing apparatus for use in a transmitting or receiving operation by a non-contact type IC card function and a reader/writer function, the apparatus including a loop antenna having a feeding element having a first number of turns winded in a predetermined form, and a non-feeding element provided inside or outside of the feeding element and having a second number of turns winded in the form.

One end of the feeding element and one end of the non-feeding element may be connected.

Both ends of the non-feeding element may be open.

The form may be a rectangle.

According to the embodiment (first embodiment) of the invention, a loop antenna having a feeding element having a first number of turns winded in a predetermined form, and a non-feeding element provided inside or outside of the feeding element and having a second number of turns winded in the form is provided in an information processing apparatus for use in a transmitting or receiving operation by a non-contact type IC card function and a reader/writer function.

According to another embodiment (second embodiment) of the invention, there is provided a loop antenna for use in a transmitting or receiving operation by a non-contact type IC card function and a reader/writer function, the antenna including a feeding element having a first number of turns winded in a predetermined form, and a non-feeding element provided inside or outside of the feeding element and having a second number of turns winded in the form.

One end of the feeding element and one end of the non-feeding element may be connected.

Both ends of the non-feeding element may be open.

The form may be a rectangle.

According to the embodiment (second embodiment) of the invention, in a loop antenna for use in a transmitting or receiving operation by a non-contact type IC card function and a reader/writer function, a feeding element having a first number of turns is winded in a predetermined form, and a non-feeding element having a second number of turns is winded in the form and provided inside or outside of the feeding element.

As described above, according to an embodiment of the invention, the communication sensitivity can be more improved.

DESCRIPTION OF THE PREFERRED EMBODIMENTS

Before describing embodiments of the invention, the correspondences between the constituent features of the invention and embodiments described in the detail description of the invention will be illustrated as follows. This description is for confirmation of the description of embodiments supporting the invention in the detail description of the invention. Therefore, it is not meant that any embodiment described in the detail description of the invention but not described herein as an embodiment corresponding to the constituent feature of the invention does not correspond to the constituent feature. Conversely, it is not meant that any embodiment described herein as the one corresponding to the constituent feature does not correspond to the other constituent features than the constituent feature.

An information processing apparatus (such as a mobile terminal apparatus 11 in FIG. 3) according to an embodiment (a first embodiment) of the invention includes a feeding element (such as straight line parts $51_1$ to $51_{13}$ in FIG. 8) having a first number of turns (such as three turns) winded in a predetermined form and a non-feeding element (such as straight line parts $51_{14}$ to $51_{18}$ in FIG. 8) provided inside or outside of the feeding element and having a second number of turns (such as one turn) winded in the form.

One end of the feeding element (such as the end of the straight line part $51_{13}$ in FIG. 8) and one end of the non-feeding element (such as the end of the straight line part $51_{14}$ in FIG. 8) may be connected.

Both ends of the non-feeding element (such as the end of the straight line part $51_{14}$ in FIG. 8 and the end of the straight line part $51_{18}$ in FIG. 8) may be open.

The form may be a rectangle.

A loop antenna (such as a loop antenna 51 in FIG. 5) according to an embodiment (a second embodiment) of the invention includes a feeding element (such as straight line parts $51_1$ to $51_{13}$ in FIG. 8) having a first number of turns (such as three turns) winded in a predetermined form and a non-feeding element (such as straight line parts $51_{14}$ to $51_{18}$ in FIG. 8) provided inside or outside of the feeding element and having a second number of turns (such as one turn) winded in the form.

One end of the feeding element (such as the end of the straight line part $51_{13}$ in FIG. 8) and one end of the non-feeding element (such as the end of the straight line part $51_{14}$ in FIG. 8) may be connected.

Both ends of the non-feeding element (such as the end of the straight line part $51_{14}$ in FIG. 8 and the end of the straight line part $51_{18}$ in FIG. 8) may be open.

The form may be a rectangle.

With reference to drawings, embodiments of the invention will be described below.

First of all, referring to FIGS. 3 and 4, the card mode and reader/writer mode, which are operations of a non-contact type IC card built in mobile equipment, will be described.

Figure 3:
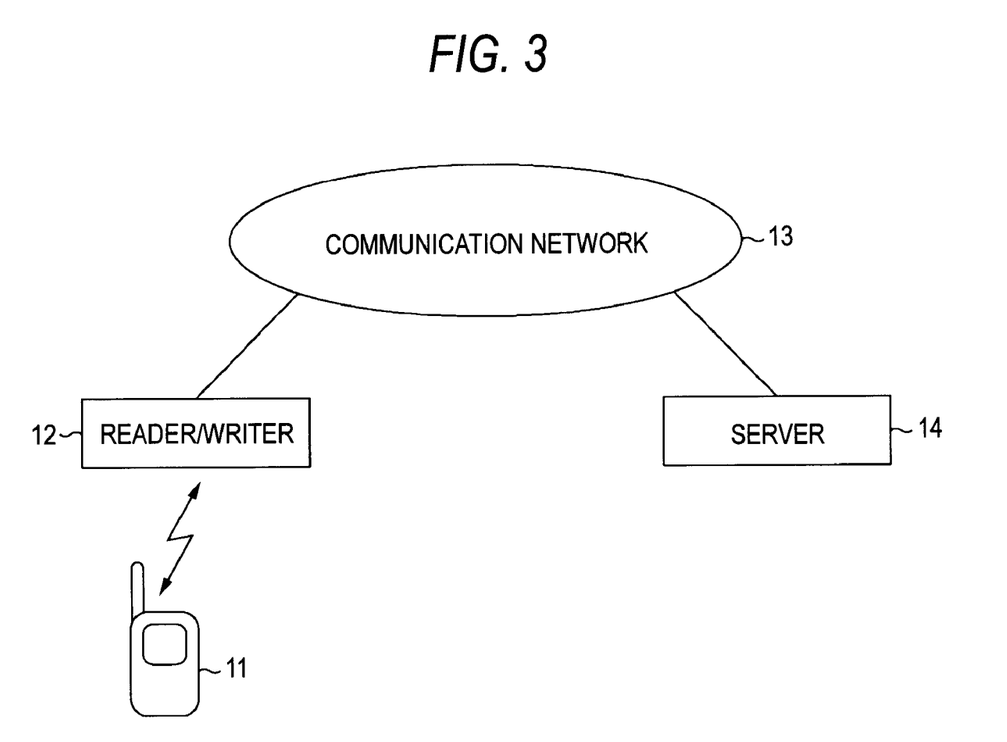
FIG. 3 is a diagram showing a construction of an embodiment of a communication system that reads/writes data from/to a mobile terminal apparatus according to an embodiment of the invention.

FIG. 3 is a diagram showing a construction of an embodiment of a communication system that reads/writes data from/to a mobile terminal apparatus 11 according to an embodiment of the invention. In the communication system shown in FIG. 3, a reader/writer 12 and a server 14 are connected to a communication network 13. The mobile terminal apparatus 11 and the reader/writer 12 communicate by radio. In other words, the communication system in FIG. 3 has the construction in which the mobile terminal apparatus 11 operates in the card mode.

The mobile terminal apparatus 11 is mobile equipment internally containing a non-contact type IC card, such as a cellular phone, a PHS (Personal Handyphone System) and a PDA (Personal Digital Assistance). The mobile terminal apparatus 11 is an example of the information processing apparatus according to an embodiment of the invention.

The non-contact type IC card internally contained in the mobile terminal apparatus 11 may store information on electronic money, purchase point of a commodity, a pre-paid fare for a train, a commuter pass, or a credit card, for example.

When the mobile terminal apparatus 11 is held over the reader/writer 12 by a user, the mobile terminal apparatus 11 exchanges data with the non-contact type IC card contained in the mobile terminal apparatus in a non-contact manner by radio communication. For example, the reader/writer 12 may generate a magnetic field at a predetermined frequency and detect a non-contact type IC card, which is at a communicable position. When the reader/writer 12 detects a communicable non-contact type IC card, the reader/writer 12 performs radio communication with the detected non-contact type IC card, whereby the connection is established. As a result, the non-contact type IC card contained in the mobile terminal apparatus 11 connects to the server 14 through the communication network 13 including the reader/writer 12 and a special line.

The server 14 may be equipment that intensively manages information (data) transmitted from the reader/writer 12 through the communication network 13, such as a special server and a generic large computer (so called mainframe). For example, the server 14 may perform predetermined authentication processing when a non-contact type IC card connects to the server 14 through the reader/writer 12 and communication network 13. If the predetermined authentication processing succeeds, the server 14 may perform predetermined processing such as reading out information stored in the non-contact type IC card and rewriting information stored in the non-contact type IC card. More specifically, when a casher in a store applies the communication system, the server 14 performs processing of reading out the balance of electronic money stored in the non-contact type IC card and rewriting the balance to the balance after the subtraction of the price of the purchased goods.

The mobile terminal apparatus 11 operates in the card mode as described above. Next, referring to FIG. 4, a case will be described in which the mobile terminal apparatus 11 operates in the reader/writer mode.

Figure 4:
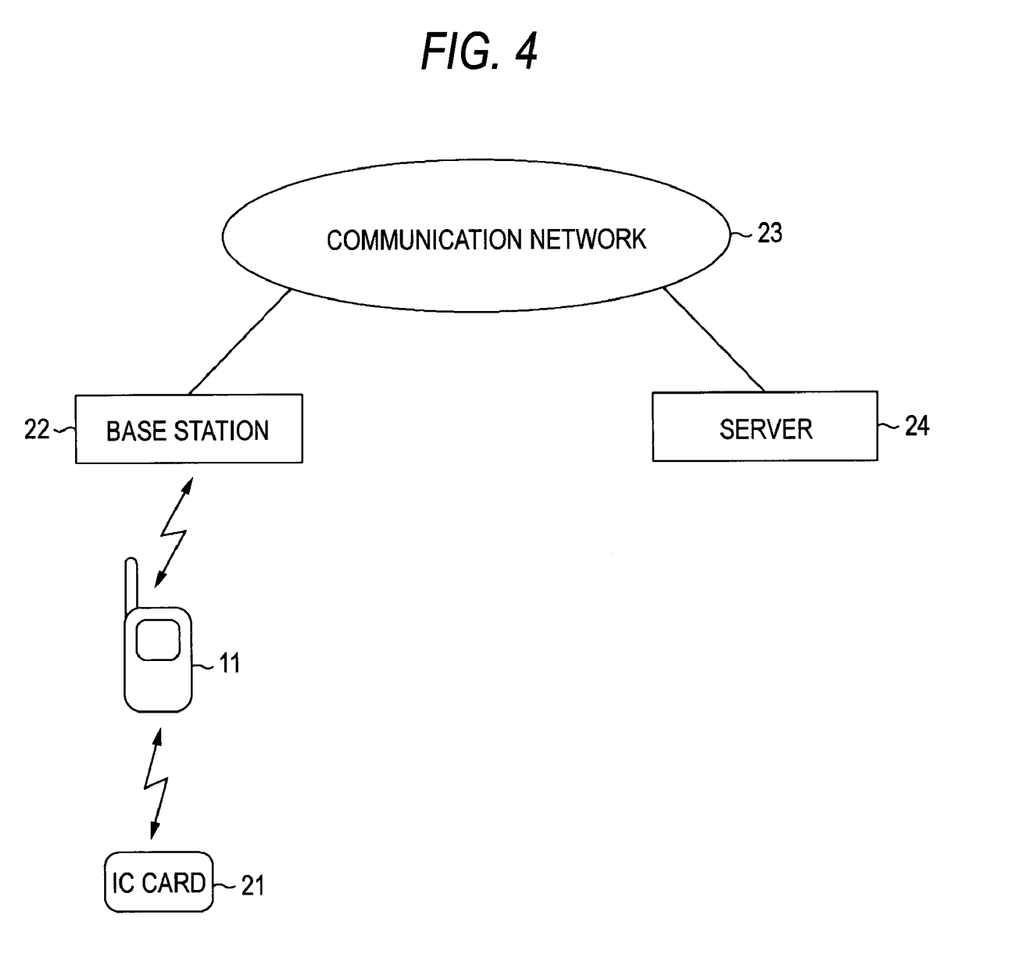
FIG. 4 is a diagram showing a construction of an embodiment of a communication system in which data is read/written from/to an external non-contact type IC card by a mobile terminal apparatus according to an embodiment of the invention.

FIG. 4 is a diagram showing a construction of an embodiment of a communication system that reads/writes data from/to another non-contact type IC card by the mobile terminal apparatus 11 according to an embodiment of the invention. The same reference numerals are given to the same components as those shown in FIG. 3, and the description will be omitted appropriately. In the communication system shown in FIG. 4, a base station 22 and a server 24 are connected to a communication network 23, and the mobile terminal apparatus 11 is connected to the base station 22. The mobile terminal apparatus 11 and the IC card 21 communicate by radio. In other words, the communication system in FIG. 4 has the construction in which the mobile terminal apparatus 11 operates in the reader/writer mode.

The mobile terminal apparatus 11 has a reader/writer function in addition to the IC card function. When the IC card 21 is held over the mobile terminal apparatus 11 by a user, the mobile terminal apparatus 11 exchanges data with the IC card 21 in a non-contact manner by radio communication. For example, the mobile terminal apparatus 11 may generate a magnetic field at a predetermined frequency and detect the IC card 21 at a communicable position. When the mobile terminal apparatus 11 detects the communicable IC card 21, the mobile terminal apparatus 11 performs radio communication with the IC card 21, whereby the connection is established. As a result, the IC card 21 connects to the server 24 through the mobile terminal apparatus 11, the base station 22 and the communication network 23.

The server 24 may be equipment that intensively manages information (data) transmitted from the mobile terminal apparatus 11 through the base station 22 and the communication network 23, such as a special server. For example, the server 24 may perform predetermined authentication processing when the IC card 21 connects to the server 24 through the mobile terminal apparatus 11, the base station 22 and the communication network 23. If the predetermined authentication processing succeeds, the server 24 may perform predetermined processing such as reading out information stored in the IC card 21 and rewriting information stored in the IC card 21.

By the way, the mobile terminal apparatus 11, which is a cellular phone, for example, includes a call processing section (not shown) that performs processing relating to a call and an IC card processing section 31, that performs predetermined processing relating to the IC card and reader/writer functions and will be described later.

Referring to FIGS. 5 to 15, the IC card processing section 31 of the mobile terminal apparatus 11 will be described below.

Figure 5:
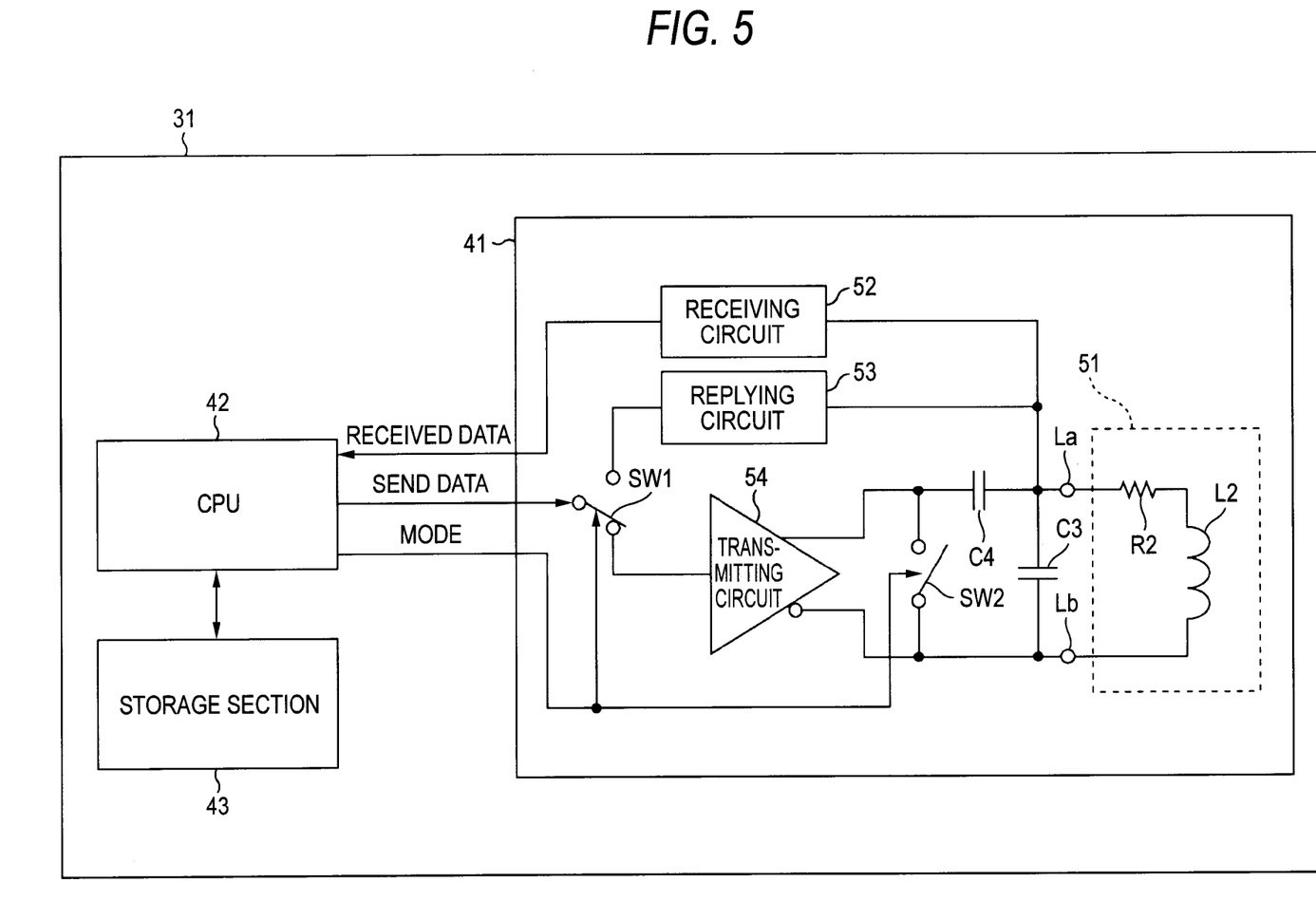
FIG. 5 is a block diagram showing a construction of an embodiment of an IC card processing portion of a mobile terminal apparatus according to an embodiment of the invention.

FIG. 5 is a block diagram showing a construction of an embodiment of the IC card processing section 31 of the mobile terminal apparatus 11 according to an embodiment of the invention.

The IC card processing section 31, when it operates in the card mode, performs predetermined processing for communicating with the reader/writer 12 by radio. The IC card processing portion 31, when it operates in the reader/writer mode, performs predetermined processing for communicating with the IC card 21 by radio.

The IC card processing section 31 includes a front end circuit 41, a CPU 42 and a storage section 43.

Under the control of the CPU 42, the front end circuit 41 receives a modulated wave (signal) transmitted from other equipment such as the reader/writer 12 and the IC card 21, performs predetermined processing on the received modulated wave, and supplies the resulting received data to the CPU 42. Under the control of the CPU 42, the front end circuit 41 performs predetermined processing on send data supplied from the CPU 42 and transmits the resulting modulated wave (signal) to other equipment such as the reader/writer 12 and the IC card 21.

The front end circuit 41 includes a switching element SW1, a switching element SW2, a capacitor C3, a capacitor C4, a loop antenna 51, a receiving circuit 52, a replying circuit 53 and a transmitting circuit 54.

The switching element SW1 may include a MOS FET (Metal Oxide Semiconductor Field Effect Transistor). The switching element SW1 switches the input in accordance with a control signal (mode) supplied from the CPU 42. In other words, the CPU 42, when it operates in the card mode, switches the input of the switching element SW1 to the replying circuit 53 side. The CPU 42, which operates in the reader/writer mode, switches the input of the switching element SW1 to the transmitting circuit 54 side.

One and the other ends of the capacitor C3 are connected to La, which is one connection end of the loop antenna 51, and Lb, which is the other connection end of the loop antenna 51, respectively. One and the other ends of the capacitor C4 are connected to the loop antenna 51 and the transmitting circuit 54, respectively.

The switching element SW2 includes a MOS FET, for example, like the switching element SW1 and switches the input in accordance with the control signal (mode) supplied from the CPU 42. In other words, the CPU 42, when it operates in the card mode, turns on (closes) the switching element SW2 while the CPU 42, when it operates in the reader/writer mode, turns off (opens) the switching element SW2.

The loop antenna 51 may contain a copper or aluminum conductor, for example, and has two or more predetermined number of turns (patterns). The loop antenna 51 may communicate with the reader/writer 12 or IC card 21, for example, by radio by using an inductive electromagnetic field as information (data) transmission medium (such as by electromagnetic induction method). The loop antenna 51 is an example of the loop antenna according to an embodiment of the invention. The shown inductance L2 exhibits the inductance component of the loop antenna 51, and the resistance R2 exhibits the resistance component of the loop antenna 51. The loop antenna 51 may be expressed by an equivalent circuit including the serially connected inductance L2 and resistance R2.

The receiving circuit 52 is shared by both of the card mode and reader/writer mode. When data is received in one mode of the card mode and the reader/writer mode, the modulated wave received by the loop antenna 51 is demodulated by performing predetermined demodulating processing, for example, thereon. The receiving circuit 52 supplies the received data resulting from the demodulation of the modulated wave to the CPU 42.

The replying circuit 53, when it operates in the card mode, modulates send data supplied from the CPU 42 by performing predetermined modulating processing thereon. The replying circuit 53 supplies the modulated wave resulting from the modulation of the send data to the loop antenna 51.

The transmitting circuit 54, when it operates in the reader/writer mode, modulates send data supplied from the CPU 42 by performing predetermined modulating processing thereon. The transmitting circuit 54 supplies the modulated wave resulting from the modulation of the send data to the loop antenna 51.

The CPU 42 controls the components of the IC card processing section 31.

The CPU 42 further performs predetermined processing based on the received data supplied from the front end circuit 41. The CPU 42 further performs predetermined processing for transmitting send data to either reader/writer 12 or IC card 21 and supplies the send data resulting from the predetermined processing to the front end circuit 41.

The storage section 43 may be a non-volatile memory including an EEPROM (Electronically Erasable and Programmable Read Only Memory) or a flash memory, for example. Under the control of the CPU 42, the storage section 43 may store data supplied from the CPU 42 or read out and supply data to the CPU 42.

In the front end circuit 41 having the construction described above, the switching elements SW1 and SW2 perform switching operations in accordance with control signals (modes) supplied from the CPU 42 thereto.

In other words, when the IC card processing section 31 operates in the card mode, the CPU 42 switches the input of the switching element SW1 to the replying circuit 53 side by using a control signal (mode). The CPU 42 further turns on the input to the switching element SW2, whereby the switching element SW2 is closed, resulting in a parallel resonant circuit including the inductance L2 and resistance R2, which are connected in series, and the capacitor C3 and capacitor C4, which are connected in parallel. The parallel resonant circuit will be described later.

In order to transmit data in the card mode here, the send data from the CPU 42 is supplied to the replying circuit 53 through the switching element SW1. The replying circuit 53 modulates based on the send data supplied from the CPU 42, for example, and supplies the created modulated wave to the loop antenna 51. The loop antenna 51 radiates the modulated wave (send data) supplied from the replying circuit 53, whereby the modulated wave is transmitted to the reader/writer 12 by radio communication.

In order to receive data in the card mode, the loop antenna 51 receives the modulated wave transmitted from the reader/writer 12 and supplies the received modulated wave to the receiving circuit 52 by radio communication. The receiving circuit 52 demodulates the modulated wave supplied from the loop antenna 51 and supplies the demodulated and created received data to the CPU 42.

On the other hand, when the IC card processing portion 31 operates in the reader/writer mode, the CPU 42 switches the input of the switching element SW1 to the transmitting circuit 54 side by using the control signal (mode) and further turns off the input of the switching element SW2, whereby the switching element SW2 is opened, resulting in a serial resonant circuit including the inductance L2 and resistance R2, the capacitor C3 connected in parallel therewith, and the capacitor C4 connected in series therewith. The serial resonant circuit will be described later.

In order to transmit data in the reader/writer mode here, the send data from the CPU 42 is supplied to the transmitting circuit 54 through the switching element SW1. The transmitting circuit 54 modulates based on the send data supplied from the CPU 42, for example, and supplies the created modulated wave to the loop antenna 51. The loop antenna 51 radiates the modulated wave (send data) supplied from the transmitting circuit 54, whereby the modulated wave is transmitted to the IC card 21 by radio communication.

In order to receive data in the reader/writer mode, the loop antenna 51 receives the modulated wave transmitted from the IC card 21 and supplies the received modulated wave to the receiving circuit 52 by radio communication. The receiving circuit 52 demodulates the modulated wave supplied from the loop antenna 51 and supplies the demodulated and created received data to the CPU 42.

In the described manner, the IC card processing section 31 operates in the card mode and reader/writer mode.

By the way, the number of turns of the loop antenna 51 depends on the mode for better communication sensitivity, as described above. In other words, the loop antenna 51 of a non-contact type IC card operating in the card mode may have improved communication sensitivity (efficient current flow) with more turns of the loop antenna 51. In operating in the reader/writer mode, fewer turns of the loop antenna 51 may improve the communication sensitivity (with efficient current flow). Referring to FIGS. 6 to 15, the numbers of turns of the loop antenna 51 in the card mode and reader/writer mode will be described below.

Figure 6:
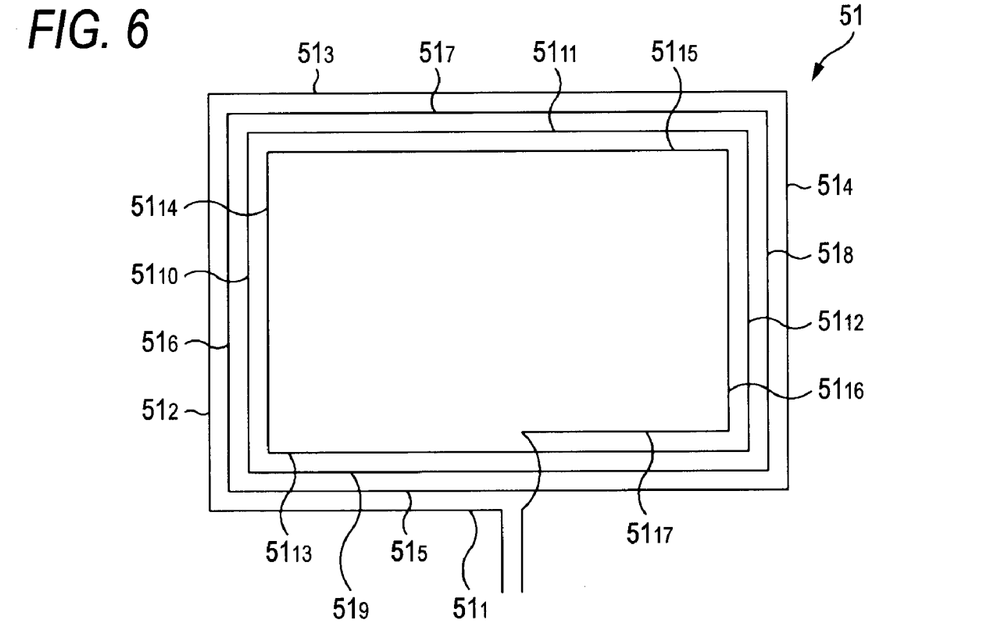
FIG. 6 is a diagram showing an example in which the number of turns of a loop antenna is four turns.

First of all, referring to FIGS. 6 to 9, four patterns will be described as examples of the numbers of turns of the loop antenna 51. FIG. 6 is a diagram showing an example in which the number of the loop antenna 51 is four turns (called pattern 1, hereinafter).

In the example shown in FIG. 6, the loop antenna 51 has straight line parts $51_1$ to $51_{17}$. Clockwise, the first turn is the rectangular one turn from the outer straight line part $51_1$ to the middle of the straight line part $51_5$. The second turn is the next rectangular one turn following the inner first turn from the middle of the staring line part $51_5$ to the middle of the straight line part $51_9$. The third turn is the rectangular one turn following the inner second turn from the middle of the staring line part $51_9$ to the middle of the straight line part $51_{13}$. The fourth turn is the rectangular one turn following the inner third turn from the middle of the straight line part $51_{13}$ to the straight line part $51_{17}$. The two ends of the loop antenna 51, that is, one end of the straight line part $51_1$ and one end of the straight line part $51_{17}$ are connected to the terminal La and terminal Lb, respectively, in FIG. 5.

Next, referring to FIG. 7, a case will be described in which the number of turns of the loop antenna 51 is four turns, and the loop antenna 51 is connected to the terminal Lb from the middle of the third turn (called pattern 2, hereinafter).

Figure 7:
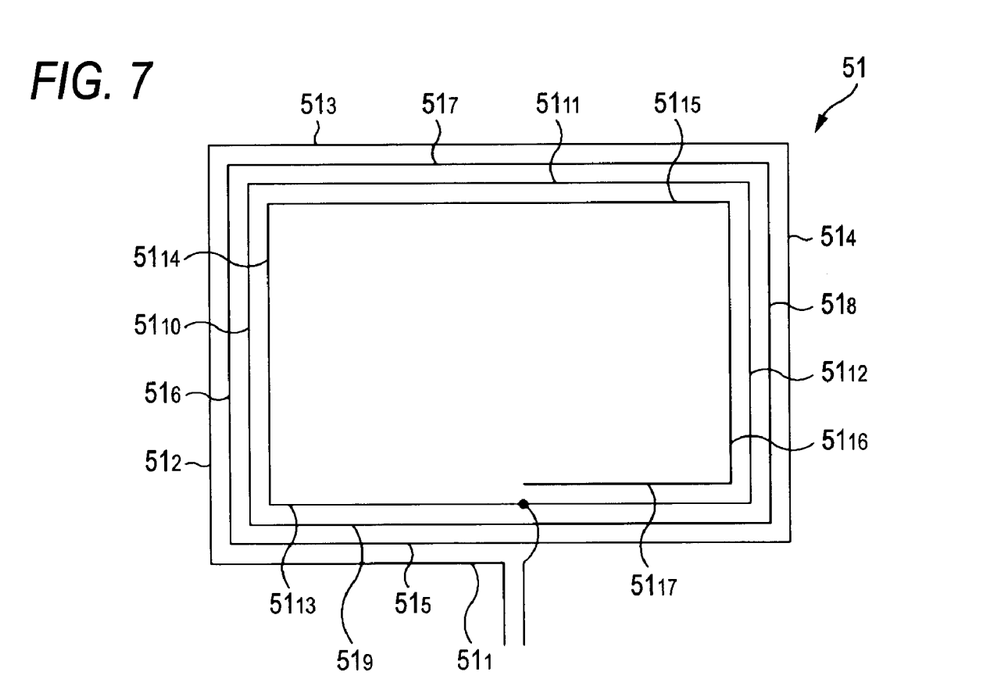
FIG. 7 is a diagram showing an example in which the number of turns of a loop antenna is four turns, and the loop antenna is connected to a terminal in the middle of the third turn.

In the example shown in FIG. 7, the loop antenna 51 has straight line parts $51_1$ to $51_{17}$, and the straight line parts make four turns like the loop antenna 51 in FIG. 6. In FIG. 7, the two ends of the loop antenna 51, that is, one end of the straight line part $51_1$ of one end of the straight line part $51_1$ and one end of the straight line part $51_{17}$ connects to the terminal La, and one end of the other straight line part $51_{17}$ is open. In other words, the antenna line from the middle of the straight line part $51_{13}$, which is the third turn, is connected to the terminal Lb, instead of the one end of the straight line part $51_{17}$.

Next, referring to FIG. 8, a case will be described in which the number of turns of the loop antenna 51 is three turns, and an open antenna line of one turn is provided inside (called pattern 3, hereinafter).

Figure 8:
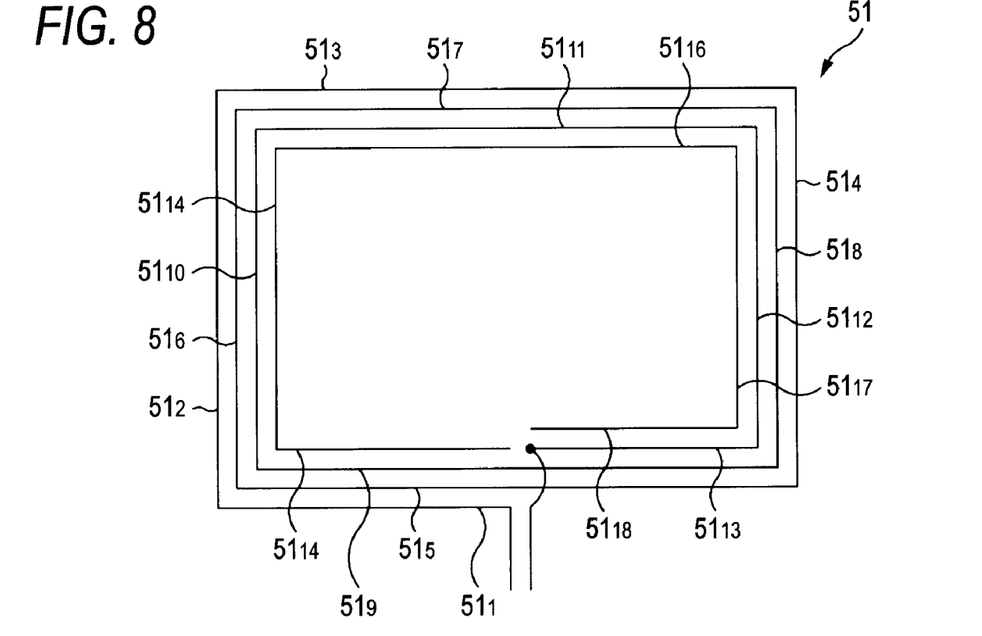
FIG. 8 is a diagram showing an example in which the number of turns of a loop antenna is three turns and an open antenna line of one turn is provided inside.

In the example shown in FIG. 8, the loop antenna 51 has straight line parts $51_1$ to $51_{18}$. Clockwise, the first turn is the rectangular one turn from the outer straight line part $51_1$ to the middle of the straight line part $51_5$. The second turn is the next rectangular one turn following the inner first turn from the middle of the straight line part $51_5$ to the middle of the straight line part $51_9$. The third turn is the rectangular one turn following the inner second turn from the middle of the straight line part $51_9$ to the middle of the straight line part $51_{13}$. The two ends of the loop antenna 51, that is, one end of the straight line part $51_1$ and one end of the straight line part $51_{13}$ are connected to the terminal La and terminal Lb, respectively. Furthermore, an open antenna line of a rectangular one turn from the straight line part $51_{14}$ to $51_{18}$ is provided inside of the straight line parts $51_1$ to $51_{13}$.

Next, referring to FIG. 9, a case will be described in which the number of turns of the loop antenna 51 is three turns (called pattern 4, hereinafter).

Figure 9:
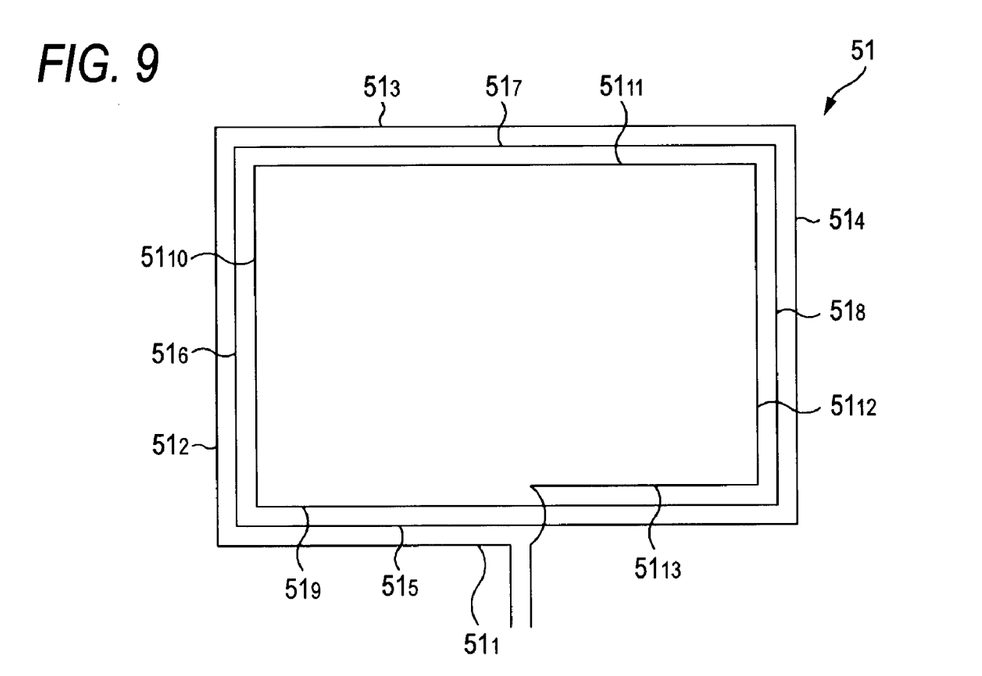
FIG. 9 is a diagram showing an example in which the number of turns of a loop antenna is three turns.

In the example shown in FIG. 9, the loop antenna 51 has straight line parts $51_1$ to $51_{13}$, and the straight line parts make three turns like the loop antenna 51 in FIG. 8. The two ends of the loop antenna 51, that is, one end of the straight line part $51_1$ and one end of the straight line part $51_{13}$ connect to the terminal La and terminal Lb. No open antenna line is provided in the loop antenna 51 in FIG. 9.

Cases will be described below in detail in which the loop antenna 51 in one of four patterns (from pattern 1 to pattern 4) having described with reference to FIGS. 6 to 9 is provided as the loop antenna 51 of the front end circuit 41 in FIG. 5 where the front end circuit 41 operates in the card mode and the reader/writer mode.

Figure 10:
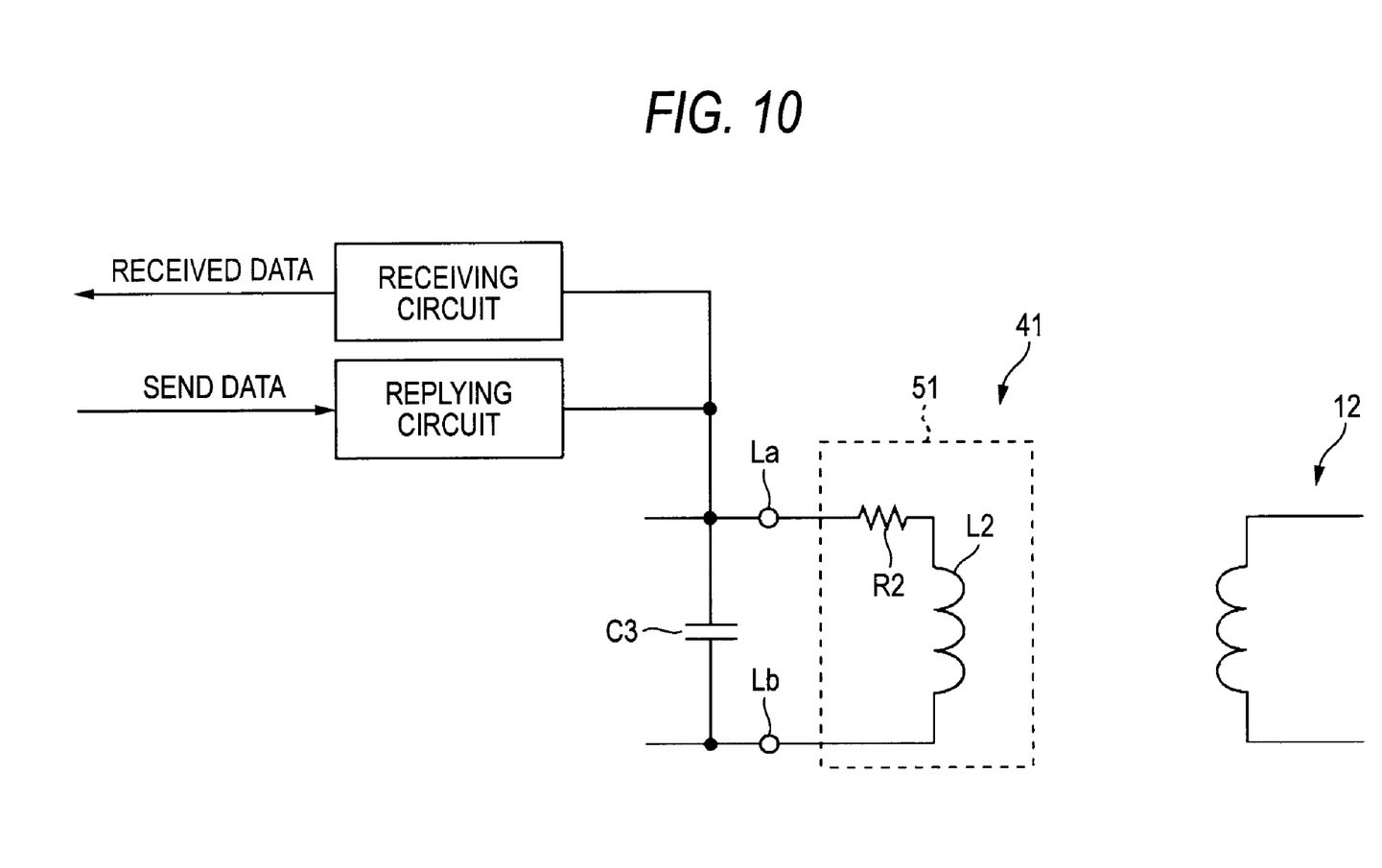
FIG. 10 is a circuit diagram when the front end circuit operates in the card mode.

First of all, referring to FIGS. 10 to 12, a case will be described in which the front end circuit 41 operates in the card mode. FIG. 10 is a circuit diagram in which the front end circuit 41 operates in the card mode.

In other words, the circuit diagram shown in FIG. 10 shows a schematic example of an equivalent circuit of a part in the front end circuit 41 in FIG. 5, which may be required when the front end circuit 41 operates in the card mode. The antenna of the reader/writer 12 is shown on the right side since the front end circuit 41 operates in the card mode. The same reference numerals are given to the same components as those shown in FIG. 5, and the description will be (appropriately) omitted herein.

As described above, the front end circuit 41, when it operates in the card mode, switches the input of the switching element SW1 to the replying circuit 53 side and turns on the input of the switching element SW2, resulting in a parallel resonant circuit including the inductance L2, resistance R2 and capacitor C3, as shown in FIG. 10.

In other words, the front end circuit 41 in FIG. 10, when it operates in the card mode, can communicate with the reader/writer 12 efficiently when a parallel resonant circuit is provided by connecting the capacitor C3 to the loop antenna 51 (inductance L2) in parallel, as shown in FIG. 10. The resonant frequency f0 here may be calculated by:

$$f0 = 1/(2.PI \ldots \text{times.}(L2.\text{times.}C3)) \quad [\text{EQ1}]$$

The impedance Z here may be calculated by:

$$Z = 1/(1/(R2 + j\omega L2) + (j\omega C3)) \quad [\text{EQ2}]$$

Here, when R2 is small, the impedance Z expressed by EQ2 is nearly infinite (Z≈∞). That is, the received voltage Vr is maximum at the peak of the impedance Z.

Figure 11:
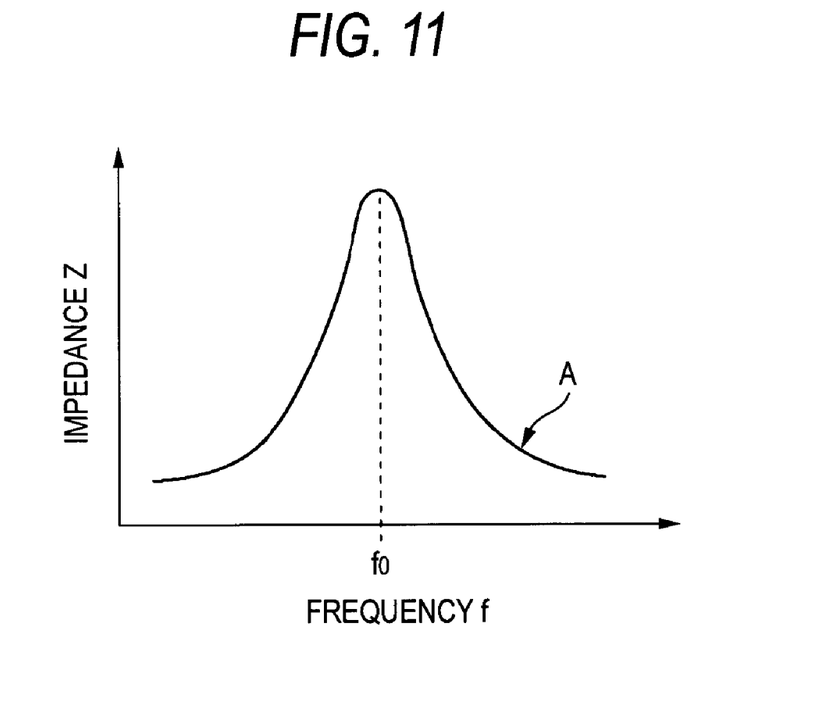
FIG. 11 is a graph indicating a relationship between resonant frequencies and impedances in a parallel resonant circuit.

The curve A in the graph in FIG. 11 exhibits the communication sensitivity characteristic where the resonant frequency of the parallel resonant circuit: including the inductance L2 and capacitor C3 in FIG. 10 is set as a resonant frequency f0 (such as 13.56 (MHZ)). In other words, in FIG. 11, the vertical axis indicates an impedance Z (.OMEGA.), and the communication sensitivity is increased as the value of the impedance Z (vertical axis) increases. The horizontal axis indicates a frequency f (MHz), and the frequency is increased as the value of the horizontal axis increases. Notably, the vertical and horizontal axes may only be required to provide the peek value of the impedance Z, and the specific axial values are therefore omitted.

On the curve A, the value of the impedance Z is the highest when the frequency is the resonant frequency f0, resulting in the best communication sensitivity (received voltage Vr (the magnitude of voltage that the front end circuit 41 receives from the reader/writer 12) at that time. In other words, the front end circuit 41, when it operates in the card mode, may require a high impedance Z in order to obtain a high received voltage Vr.

Figure 12:
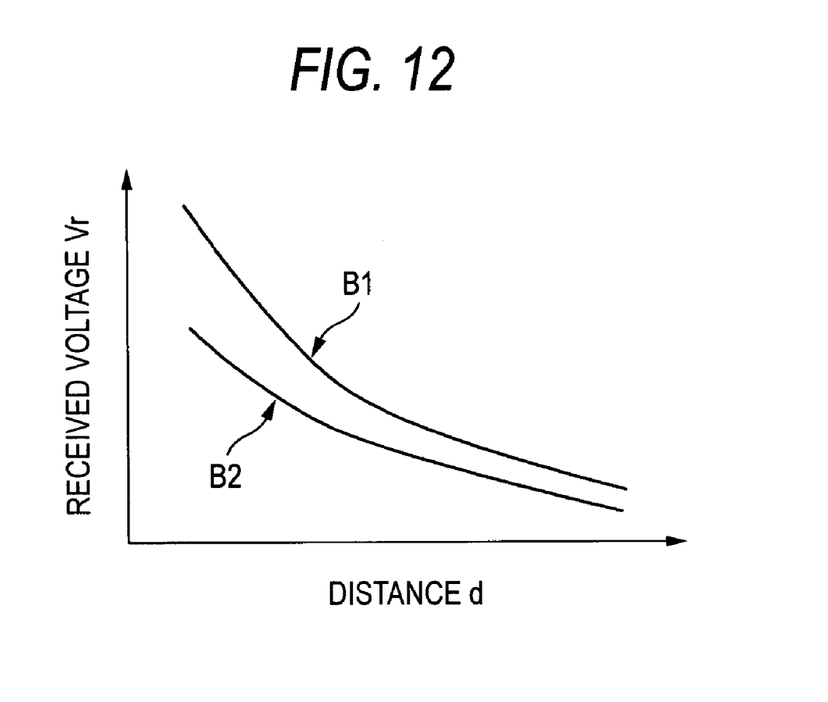
FIG. 12 is a graph showing a relationship between actually measured received voltages and distances when the loop antenna in one of patterns 1 to 4 is provided in the front end circuit.

FIG. 12 is a graph showing a relationship between actually measured received voltages Vr and distances d when the loop antenna 51 in one of patterns 1 to 4 is provided as the loop antenna 51 of the front end circuit 41.

In the example shown in FIG. 12, the vertical axis indicates a received voltage Vr received from the reader/writer 12, and the voltage received from the reader/writer 12 can be increased as the value of the vertical axis increases. The horizontal axis indicates a distance d from the reader/writer 12, and the distance from the reader/writer 12 increases as the value of the horizontal axis increases. The vertical and horizontal axes may only allow the comparison between curves B1 and B2, and the specific axial values are therefore omitted.

In the example shown in FIG. 12, the curve B1 is a curve indicating the relationship between the received voltages Vr and the distances d when the loop antenna 51 in one of the patterns 1 to 3 is provided as the loop antenna 51 of the front end circuit 41.

More specifically, the curve B1 is a curve indicating the relationship between the received voltages Vr and the distances d when the loop antenna 51 in either one form in which the number of turns is four turns, the number of turns of the loop antenna 51 is four turns with the middle of the third turn connecting to the terminal Lb or the number of turns is three turns internally having an open antenna line of one turn, as shown in FIGS. 6 to 8, is provided as the loop antenna 51 of the front end circuit 41.

The curve B2 is a curve indicating the relationship between the received voltages Vr and the distances d when the loop antenna 51 in pattern 4 is provided as the loop antenna 51 of the front end circuit 41.

More specifically, the curve B2 is a curve indicating the relationship between the received voltages Vr and the distances d when the loop antenna 51 in a form in which the number of turns is three turns is provided as the loop antenna 51 of the front end circuit 41, as shown in FIG. 9.

In other words, as described above, in an operation in the card mode, since a loop antenna having more turns produces better communication sensitivity, pattern 1 with more turns than that of pattern 4 results in the curve B1, which is a curve with higher received voltage Vr, and pattern 4 with fewer turns than that of pattern 1 results in the curve B2, which is a curve with lower received voltages Vr. Patterns 2 and 3 also result in the curve B1, which is a curve with higher received voltages Vr.

When the loop antenna 51 in one of the patterns 1 to 3 is provided as the loop antenna 51 of the front end circuit 41, the received voltage Vr received from the reader/writer 12 is higher, that is, the sensitivity is better than that of the case where the loop antenna 51 in pattern 4 is provided. This has been verified by experiments on the embodiments of the invention.

Figure 13:
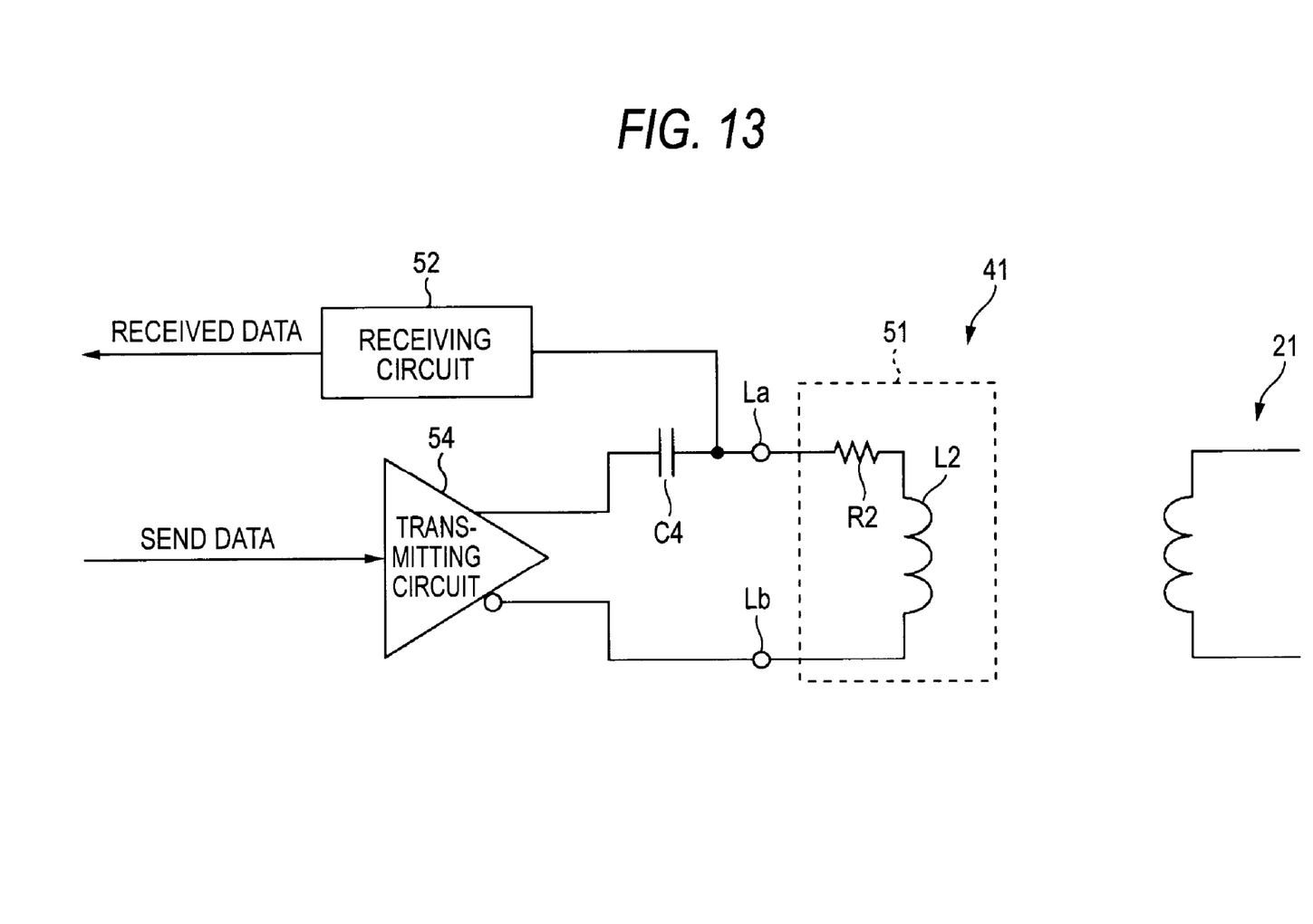
FIG. 13 is a circuit diagram when the front end circuit operates in the reader/writer mode.
Figure 14:
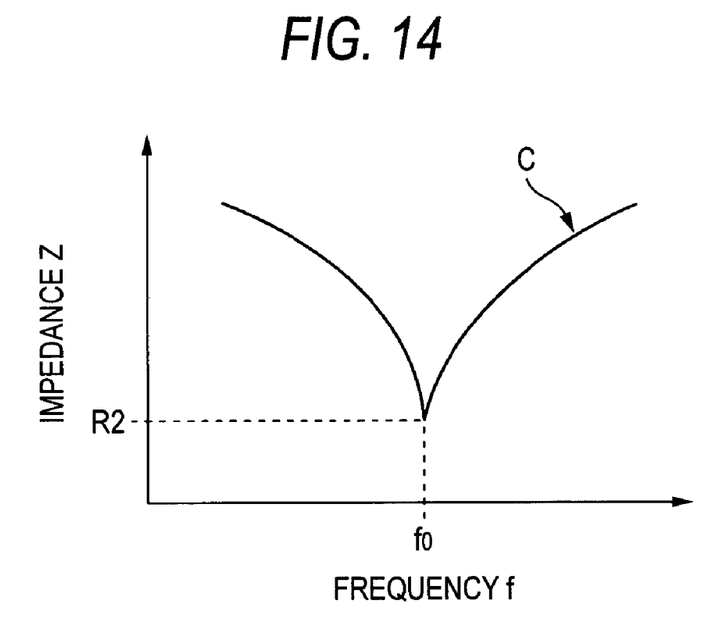
FIG. 14 is a graph indicating a relationship between resonant frequencies and impedances in a serial resonant circuit.

Next, referring to FIGS. 13 to 15, a case will be described in which the front end circuit 41 operates in the reader/writer mode. FIG. 13 is a circuit diagram when the front end circuit 41 operates in the reader/writer mode.

In other words, the circuit diagram shown in FIG. 13 shows an example of a schematic equivalent circuit of the part, which may be required when the front end circuit 41 operates in the reader/writer mode, in the front end circuit 41 in FIG. 5. A loop antenna of the IC card 21 is shown on the right since the front end circuit 41 operates in the reader/writer mode. The same reference numerals are given to the same components as those shown in FIG. 5, and the description will be (appropriately) omitted.

As described above, the front end circuit 41, when it operates in the reader/writer mode, switches the input of the switching element SW1 to the transmitting circuit 54 side and turns off the input of the switching element SW2, resulting in a serial resonant circuit including the inductance L2, resistance R2 and capacitor C4, as shown in FIG. 13.

In other words, the front end circuit 41 in FIG. 13, when it operates in the reader/writer mode, can communicate with the IC card 21 efficiently when a serial resonant circuit is provided by connecting the capacitor C4 and the loop antenna 51 (inductance L2) in series, as shown in FIG. 13. The resonant frequency f0 here may be calculated by:

$$f0=1/(2.PI\ldots \text{times}.(L2.\text{times}.C4)) \quad [EQ3]$$

The impedance Z here may be calculated by:

$$Z=R2+(j\omega L2)+(1/(j\omega C4)) \quad [EQ4]$$

Here, the mutual cancellation of the impedances of the L2 and C4 at the resonant frequency f0 results in Z=R2, and when R2 is small, current can be passed to the loop antenna efficiently. Then, the maximum magnetic field can be generated.

The curve C as shown in the graph in FIG. 1.4 exhibits the communication sensitivity characteristic where the resonant frequency of the serial resonant Circuit including the inductance L2 and capacitor C4 in FIG. 13 is set as a resonant frequency f0 (such as 13.56 (MHz)). In other words, in FIG. 14, the vertical axis indicates an impedance Z (.OMEGA.), and the communication sensitivity is increased as the value of the impedance Z (vertical axis) decreases. The horizontal axis indicates a frequency f (MHz), and the frequency is increased as the value of the horizontal axis increases. Notably, the vertical and horizontal axes may only require to provide the bottom value of the impedance Z, and the specific axial values are therefore omitted.

On the curve C, the value of the impedance Z is the lowest when the frequency is the resonant frequency f0, resulting in the best communication sensitivity (received voltage Vt (the magnitude of voltage that the IC card 21 receives from the front end circuit 41) at that time. In other words, the front end circuit 41, when it operates in the reader/writer mode, may require a low impedance Z in order to obtain a high received voltage Vt.

Figure 15:
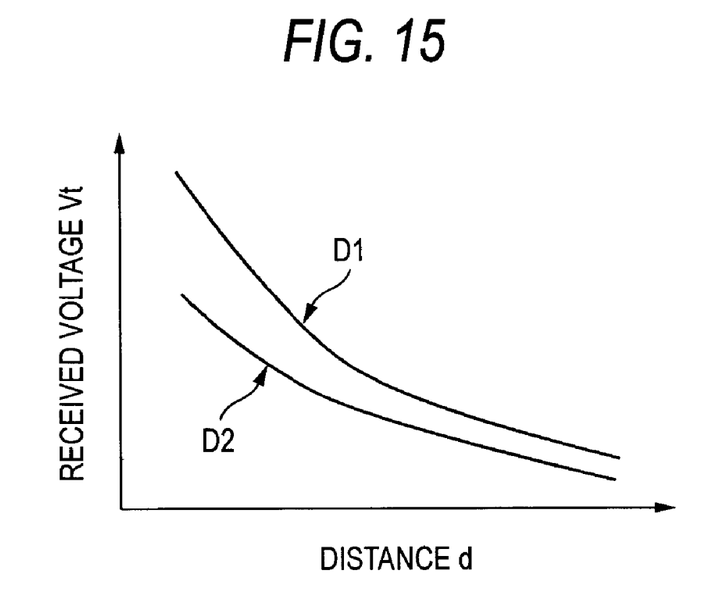
FIG. 15 is a graph indicating actually measured received voltages and distances when the loop antennas in patterns 1 to 4 are provided in the front end circuit.

FIG. 15 is a graph showing a relationship between received voltages Vt and distances d when the loop antenna 51 in one of patterns 1 to 4 is provided as the loop antenna 51 of the front end circuit 41.

In the example shown in FIG. 15, the vertical axis indicates a received voltage Vt received from the IC card 21, and the voltage received by the IC card 21 can be increased as the value of the vertical axis increases. The horizontal axis indicates a distance d from the IC card 21, and the distance from the IC card 21 increases as the value of the horizontal axis increases. The vertical and horizontal axes may be only required to allow the comparison between curves D1 and D2, and the specific axial values are therefore omitted.

In the example shown in FIG. 15, the curve D1 is a curve indicating the relationship between actually measured received voltages Vt and the distances d when the loop antenna 51 in one of the patterns 2 to 4 is provided as the loop antenna 51 of the front end circuit 41.

More specifically, the curve D1 is a curve indicating the relationship between the received voltages Vt and the distances d when the loop antenna 51 in either one form in which the number of turns of the loop antenna 51 is four turns with the middle of the third turn connecting to the terminal Lb, the number of turns is three turns internally having an open antenna line of one turn or the number of turns is three turns, as shown in FIGS. 7 to 9, is provided as the loop antenna 51 of the front end circuit 41.

The curve D2 is a curve indicating the relationship between the received voltages Vt and the distances d when the loop antenna 51 in pattern 1 is provided as the loop antenna 51 of the front end circuit 41.

More specifically, the curve D2 is a curve indicating the relationship between the received voltages Vt and the distances d when the loop antenna 51 in a form in which the number of turns is four turns is provided as the loop antenna 51 of the front end circuit 41, as shown in FIG. 6.

In other words, as described above, in an operation in the reader/writer mode, since a loop antenna having fewer turns produces better communication sensitivity, pattern 4 with fewer turns than that of pattern 1 results in the curve D1, which is a curve with higher received voltages Vt, and pattern 1 with more turns than that of pattern 4 results in the curve D2, which is a curve with lower received voltages Vt. Patterns 2 and 3 also result in the curve D1, which is a curve with higher received voltage Vt.

When the loop antenna 51 in one of the patterns 2 to 4 is provided as the loop antenna 51 of the front end circuit 41, the received voltage Vt received by the IC card 21 is higher, that is, the sensitivity is better than that of the case where the loop antenna 51 in pattern 1 is provided. This has been verified by experiments on the embodiments of the invention.

Therefore, when the loop antenna 51 in one of patterns 2 and 3 is provided as the loop antenna 51 of the front end circuit 41, the front end circuit 41, when it operates in the card mode, exhibits the curve B1 in FIG. 12 with higher received voltage Vr while the front end circuit 41, when it operates in the reader/writer mode, exhibits the curve D1 in FIG. 15 with higher received voltage Vt.

In other words, the communication sensitivity can be improved in both of the card mode and the reader/writer mode by connecting the middle of a predetermined turn to the terminal Lb or providing an open antenna line of one turn (that is, providing a dummy antenna line) inside of the loop antenna 51 with a predetermined number of turns like patterns 2 and 3, instead of the loop antenna 51 with a predetermined number of turns (such as three and four turns) like patterns 1 and 4.

As described above, according to an embodiment of the invention, the mobile terminal apparatus 11 internally containing a non-contact type IC card can have more improved communication sensitivity in both of the card mode and the reader/writer mode.

According to an embodiment of the invention, the front end circuit 41 may only include one loop antenna (the loop antenna 51 in either pattern 2 or pattern 3) without separately preparing the loop antenna 51 for the card mode and the reader/writer mode. Thus, the front end circuit 41 may be designed easily without consideration of influences such as interference of loop antennas. Furthermore, a decrease in number of loop antennas may reduce the costs because of decreases in number of parts and/or circuits.

Notably, the loop antenna 51 according to an embodiment of the invention may have any number of turns instead of three and four turns in patterns 2 (FIG. 7) and 3 (FIG. 8) as described above. For example, the number of turns of the loop antenna 51 may be six turns instead of the number of turns of the loop antenna 51 in pattern 2, and the middle of the fifth turn may be connected to the terminal Lb. Alternatively, for example, the number of turns of the loop antenna 51 may be five turns instead of the number of turns of the loop antenna 51 in pattern 3, and an open antenna line of one turn may be provided inside. Furthermore, when the number of turns of the loop antenna 51 in pattern 2 is four turns, the middle of the second turn may be connected to the terminal Lb. Alternatively, when the number of turns of the loop antenna 51 in pattern 3 is three turns, an open antenna line of two turns may be provided inside. In this way, the number of turns of the antenna line functioning as a dummy is adjustable.

Having described an antenna line functioning as a dummy is provided inside in the example above, the antenna line functioning as a dummy may be provided outside according to an embodiment of the invention. For example, when the number of turns of the loop antenna 51 in pattern 3 is three turns, an open antenna line of one turn may be provided outside.

Furthermore, having described that the form of the loop antenna 51 is a rectangular form in the example described above, the invention is not limited thereto. For example, the form of the loop antenna 51 may be any form that allows winding by two or more turns, such as a circle, a rectangle, an ellipse and a polygon.

The term, "system", herein refers to the entire apparatus including multiple devices.

The embodiments of the invention are not limited to the embodiments above but may be changed in various forms without departing the spirit and scope of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for radio communication between a non-contact type IC card and a card reader/writer, the apparatus comprising:

a front end circuit having a loop antenna for radio communication between the non-contact IC card and the card reader/writer, said front end circuit switchably configurable between a card mode of operation and a reader/writer mode of operation, said loop antenna comprising a feeding element having a first number of turns wound in a predetermined form and a non-feeding element having a second number of turns wound in the predetermined form.

2. The apparatus according to claim 1, wherein the first number of turns is three and the second number of turns is one.

3. The apparatus according to claim 1, wherein the non-feeding element is an open antenna line.

4. The apparatus according to claim 1, wherein the form is a rectangle.

5. An apparatus for radio communication between a non-contact type IC card and a card reader/writer, the apparatus comprising:
- a front end circuit having a loop antenna for radio communication between the non-contact IC card and the card reader/writer, said front end circuit switchably configurable between a card mode of operation and a reader/writer mode of operation, said loop antenna comprising a feeding element having a first number of turns wound in a predetermined form, the feeding element having a first electrical connection with the front end circuit, said first connection located at a first end of said feeding element, and the feeding element having a second electrical connection with the front end circuit, said second connection located a second number of turns from the first end.

6. The apparatus according to claim 5, wherein the first number of turns is four and the second number of turns is three.

7. The apparatus according to claim 5, wherein the form is a rectangle.

* * * * *